United States Patent
Tam

(10) Patent No.: US 8,536,511 B2
(45) Date of Patent: *Sep. 17, 2013

(54) LIGHT SENSING DEVICE HAVING A COLOR SENSOR AND A CLEAR SENSOR FOR INFRARED REJECTION

(75) Inventor: Ching Yu John Tam, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,156

(22) Filed: Jul. 2, 2012

(65) Prior Publication Data

US 2013/0002731 A1    Jan. 3, 2013

Related U.S. Application Data

(63) Continuation of application No. 13/212,983, filed on Aug. 18, 2011, now Pat. No. 8,217,336, which is a continuation of application No. 12/435,909, filed on May 5, 2009, now Pat. No. 8,008,613.

(51) Int. Cl.
*H01J 5/16* (2006.01)

(52) U.S. Cl.
USPC ........................................ 250/226; 250/214.1

(58) Field of Classification Search
USPC ............... 250/226, 214.1, 208.1, 239, 338.1, 250/216; 455/556.1, 566; 257/290–292, 257/440
See application file for complete search history.

(56) References Cited

U.S. PATENT DOCUMENTS

| | | | |
|---|---|---|---|
| 4,539,482 A | 9/1985 | Nose | |
| 4,827,118 A * | 5/1989 | Shibata et al. | 257/432 |
| 6,211,521 B1 | 4/2001 | Bawolek et al. | |
| 6,556,301 B2 | 4/2003 | Carter | |
| 6,818,328 B2 | 11/2004 | Utsumi et al. | |
| 7,196,391 B2 | 3/2007 | Hsieh | |
| 8,076,628 B2 | 12/2011 | Mahowald | |
| 2004/0251404 A1 | 12/2004 | Duijve | |
| 2007/0268552 A1 | 11/2007 | Takita | |
| 2008/0006762 A1 | 1/2008 | Fadell et al. | |

(Continued)

FOREIGN PATENT DOCUMENTS

| | | |
|---|---|---|
| JP | 2001218195 | 8/2001 |
| JP | 2007197213 | 8/2007 |

(Continued)

OTHER PUBLICATIONS

Non-Final Office Action (dated Dec. 1, 2011), U.S. Appl. No. 13/212,983, filed Aug. 18, 2011, First Named Inventor: Ching Yu John Tam, (8 pages).

(Continued)

*Primary Examiner* — Que T Le
(74) *Attorney, Agent, or Firm* — Blakely, Sokoloff, Taylor & Zafman LLP

(57) ABSTRACT

A light sensing device has a first filter to block visible light in a light path. The light sensing device also has a first color sensor and a clear sensor, to detect light in the light path after the first filter. A light intensity calculator computes a measure of the intensity of visible light in the light path, based on a difference between (a) an output signal of the first color sensor, and (b) an output signal of the clear sensor. Other embodiments are also described and claimed.

24 Claims, 3 Drawing Sheets

(56) References Cited

U.S. PATENT DOCUMENTS

| 2008/0158173 | A1 | 7/2008 | Hamblin et al. |
| 2008/0191298 | A1 | 8/2008 | Lin et al. |
| 2009/0015166 | A1 | 1/2009 | Kwon |
| 2009/0073537 | A1 | 3/2009 | Taverner |

FOREIGN PATENT DOCUMENTS

| JP | 2008289001 | | 11/2008 |
| WO | WO-2008073783 | A2 | 6/2008 |
| WO | WO-2009093746 | A1 | 7/2009 |

OTHER PUBLICATIONS

CN Third Office Action (dated Dec. 14, 2012), Application No. 201010172628.1, Date Filed May 5, 2010, (4 pages).

RU Official Action (dated Nov. 22, 2012), Russian Federation Application No. 2011149308, Date Filed—Apr. 28, 2010, (6 pages).

Product Group: Opto-electronics; Product Sub-group Optical Sensors (CCDs, MEMS, CMOS, photodiodes, optocouplers, etc.), TAOS introduces RGB digital colour light sensors, Aug. 10, 2008, TAOS Inc., Internet page at: http://www.epn-online.com/page/new600951taos, (1 page).

European Search Report (dated Nov. 15, 2010), Application No. 10161858.5, Filing Date—May 4, 2010, (7 pages).

PCT International Search Report (dated Dec. 6, 2010), International Application No. PCT/US10/32849, International Filing Date—Apr. 18, 2010, (14 pages).

"Color Classification with the TCS230 Identifying and Sorting Colors by Hue", Intelligent Opto Sensor, Designer's Notebook No. 11, Mar. 4, 2004, TAOS (Texas Advanced Optoelectronic Solutions), (7 pages).

"TCS3404, TCS3414 Digital Color Light Sensors", TAOS068, Sep. 2008, TAOS (Texas Advanced Optoelectronic Solutions), Texas USA, (40 pages).

"TSL2560, TSL2561 Light-to-Digital Converter", TAOS059L, Jan. 2008, TAOS (Texas Advanced Optoelectronic Solutions), Texas USA, (38 pages).

Papalias, Tamara A., et al., "Making Sense of Light Sensors", Intersil®, Application Note, May 9, 2007, AN1311.0, (5 pages).

PCT International Preliminary Report on Patentability mailed Nov. 17, 2011, for PCT/US2010/0323849, filed Apr. 28, 2010.

CN Second Office Action (dated Mar. 30, 2012), Application No. 201010172628.1, Date filed May 5, 2010, (21 pgs.).

\* cited by examiner

LIGHT SENSING DEVICE HAVING A COLOR SENSOR AND A CLEAR SENSOR FOR INFRARED REJECTION

RELATED MATTERS

This application is a continuation of U.S. patent application Ser. No. 13/212,983, filed Aug. 18, 2011 now U.S. Pat. No. 8,217,336, which is a continuation of U.S. patent application Ser. No. 12/435,909, filed May 5, 2009 now U.S. Pat. No. 8,008,613, entitled "Light Sensing Device Having a Color Sensor and a Clear Sensor for Infrared Rejection", currently pending.

An embodiment of the invention relates to portable electronic devices that have an integrated ambient light sensor (ALS). Other embodiments are also described.

BACKGROUND

Portable electronic devices, such as multi-function smart phones, digital media players, and dedicated digital cameras and navigation devices, have display screens that can be used under various lighting environments. Such devices have integrated in them a function that can provide (in real-time) an indication of the current level of visible light in the immediate environment outside the device. This is called an ambient light sensor function (or ALS). The ALS can be used for applications such as automatically managing the brightness of a display screen for better legibility or for conserving battery energy (depending upon the current ambient light level).

Most recently, advanced, consumer grade, ALS integrated circuit (IC) devices have been developed that have a built-in solid state light sensor together with associated analog and digital circuitry that provide, in real-time, a fairly accurate measurement of the ambient visible light that is incident upon the IC device. These IC devices are for the most part manufactured in accordance with a complementary metal oxide semiconductor (CMOS) fabrication process technology.

The response of many typical CMOS light sensor structures (e.g., CMOS photodiodes) is dominated by infrared (IR) content, rather than visible content. This creates a problem under some artificial lighting environments. For example, a CMOS-based ALS device would likely indicate that its ambient environment is "brighter" when lit by an incandescent lamp compared to a fluorescent lamp. That is because incandescent lamp lighting has fairly high IR content compared to, for example, fluorescent lamp lighting, and the sensor cannot distinguish between lighting conditions where IR dominates and those where visible dominates. To help alleviate this problem, an IR blocking filter (IR cut filter) can be placed in front of the sensor, to thereby lessen the sensitivity of the sensor's output to IR content.

In practice of course, the IR cut filter is not ideal in that there still is an appreciable amount of IR content that will pass through the filter and be detected by the sensor. Although relatively small, such IR leakage may still be too much for an ALS in the following situation. Consider the case where a light transparent cover of a portable electronic device is to have a relatively smooth or uniform front surface, without any physical openings therein. An ALS chip is located below the cover, to sense the ambient light level outside the device. In some cases, it is desired to also make the front surface appear dark from outside (e.g., for aesthetic reasons). To achieve this, a layer of IR transmission ink can be applied to the backside of the cover, which gives the front of the cover a uniform, dark color (e.g., black). The IR ink layer, however, allows very little visible content to pass through and reach the sensor below (e.g., no more than about 5% transmission). This diminishes the ability to distinguish IR from visible in the sensor's output signal (despite the reduction in IR content achieved using the IR cut filter).

SUMMARY

An embodiment of the invention is a light sensing device that can perform the function of an ambient light sensor (ALS) in a portable electronic device. The elements of the device include a first filter that blocks visible light in a light path, and a set of sensors to detect the light in the light path, after the first filter. These include at least a first color sensor and a clear sensor. The device also has a light intensity calculator that computes a measure of the intensity of visible light in the light path. The calculation is based on a difference between an output signal of the first color sensor, and an output signal of the clear sensor. In other words, the measure of ambient light level is computed based on the differential of at least one color channel and the clear channel. In this manner, the IR content in the light path is advantageously cancelled (when taking the difference between the output signals of the color and clear sensors).

In another embodiment, the calculation of light intensity (representing the ambient light level) uses not just the difference between one color channel and the clear channel, but also a further difference quantity, namely the difference between another color channel and the clear channel. Such a technique may be useful when the first and second color sensors are red and blue sensors, respectively, for example, which are readily available as part of conventional RGB light sensors. Under that scenario, the intensity calculator converts at least two clear-color differentials, which represent cyan and yellow values, respectively, into a green value. The latter may then be used to calculate a lux value, which is a direct measure of the light intensity.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
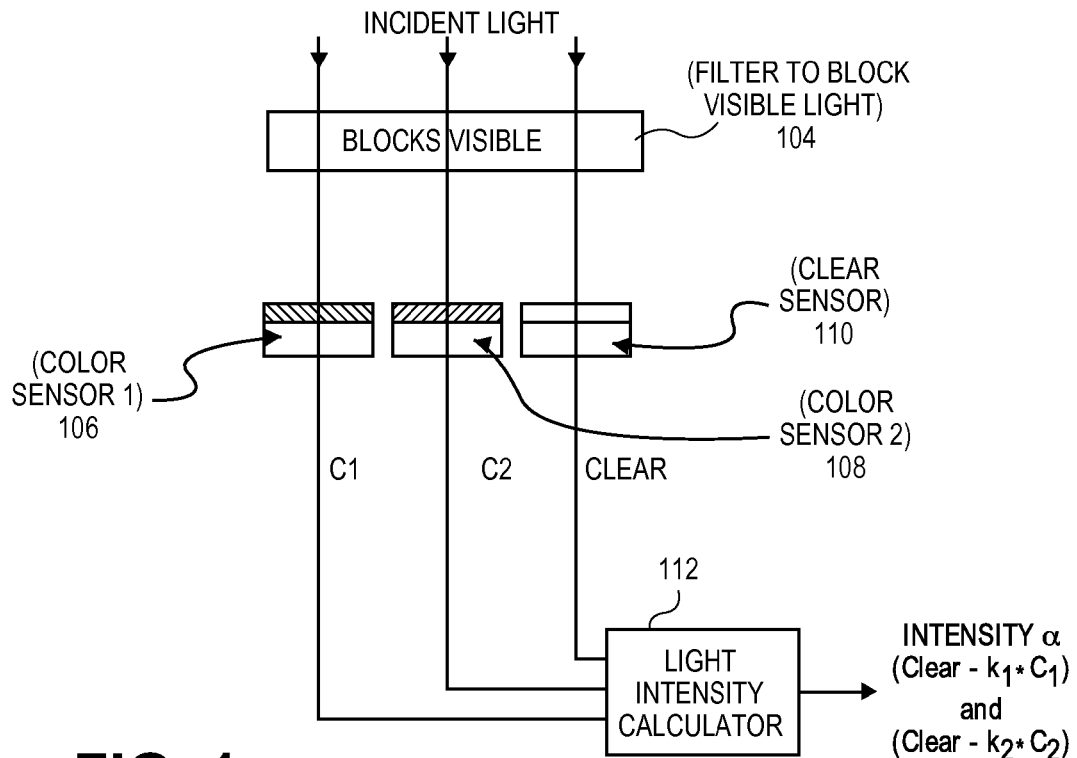
FIG. 1 is a block diagram of an ambient light sensor, in accordance with an embodiment of the invention.

Referring to FIG. 1, a block diagram of an ambient light sensor (ALS), in accordance with an embodiment of the invention is shown. The incident light that is to be sensed, for determining the level of visible content therein, follows a light path through a first filter 104 that blocks the visible content, before reaching a set of light sensors 106, 108, 110 below. The first filter 104 serves to essentially hide from view the sensor electronics that lie underneath it and that would otherwise be visible from above the filter 104 to the naked eye. This may serve an esthetic function, for example, where a uniform or smooth and dark look is desired, above the filter 104. This may be achieved by constructing the filter 104 as part of a substrate on which there is a layer of IR transmitting ink that also blocks visible light.

Of course, while the filter 104 is said to block visible light, in a practical sense it does not "completely" block all visible light. For example, in one implementation, the filter 104 has a transmission of about 2%-5% in the visible spectrum and over 90% in the IR spectrum. If the transmission rate for visible content were much higher than that, then the filter 104 might not give a sufficiently dark appearance from above (allowing the sensor electronics below to be quite visible). On the other hand, if the transmission for visible content were too low (e.g., significantly below 2%), then an insufficient amount of visible light would reach the light sensors 106-110. The transmission of the filter 104 should be selected based on the sensitivity of the light sensors 106-110 to visible content, in relation to their sensitivity to IR content (which is also present in the incident light).

The output of a color light sensor 106, 108 provides a signal that is indicative of a sensed intensity of light of a particular visible color and not others. Viewed another way, the color light sensor is a light sensing means that is tuned to detect a particular visible color. In contrast, the clear sensor 110 outputs a signal that is indicative of the sensed intensity of light of several visible colors. In particular, the clear sensor may output a signal that gives the sensed intensity of light across the entire visible spectrum.

The light sensors 106-110 may be solid state CMOS sensors or other suitable sensors that have sufficient sensitivity to visible light. These include photodiodes and phototransistors built in a CMOS fabrication process or other suitable semiconductor or integrated circuit fabrication process. There is at least one color sensor 106 and at least one clear sensor 110, although the embodiment depicted in FIG. 1 has an additional color sensor 108. In one implementation, each of the color sensors 106, 108 has a different color filter element that covers a respective photodetector element. In other words, each of the color sensors 106, 108 is tuned to sense a different color of visible light. In contrast to the color sensors 106, 108, the clear sensor 110 outputs a signal that indicates sensed intensity of light of a broad range of different visible colors, as opposed to just a single color.

In addition, the photodetector elements of the color sensors 106, 108 are electrically matched with the photodetector element of the clear sensor 110. In other words, if the color sensor 106 were a red sensor, then the output signal of the color sensor 106 would be very close to the output signal from the clear sensor 110, if the incident light contained only red content. Similarly, if the color sensor 108 were a blue sensor and the incident light contained only blue content, then the output signals from the color sensor 108 and the clear sensor 110 would be very close. In addition, the IR response of each of the sensors 106-110 should also be electrically matched (which will enable a more accurate cancellation of the IR content in the equation below). The electrical matching of the photodetector elements may be achieved using different fabrication techniques such as positioning the photodetecting elements as close to each other as possible, building them in the same substrate using the same manufacturing process operations, and designing them to have the same physical dimensions and circuit topology.

The ambient light sensor in FIG. 1 also includes a light intensity calculator 112 that computes a measure of the intensity of visible light in the light path in which the sensors 106-110 lie. For the embodiment in FIG. 1, the calculation is based on at least two differentials, namely the difference between the output signal of the clear sensor and that of the first color sensor 106, and a difference between the output of the clear sensor and that of the second color sensor 108. This is depicted in mathematical form as the following relationship:

$$\text{Intensity} \propto (\text{Clear} - k_1 * C_1) \text{ and } (\text{Clear} - k_2 * C_2) \quad [\text{Equation 1}]$$

where $k_1$ and $k_2$ are proportionality or mismatch constants that should be selected during a calibration procedure so that each of the terms in the parenthesis in the above equation results in a sufficiently good cancellation of the effect of the IR content in the light path. For example, the constants $k_1$ and $k_2$ may help remove the effect of mismatch between the color sensors 106, 108 and the clear sensor 110 in terms of their respective responses to the same IR content in the incident light (after the filter 104).

As explained further below, implementation of the light intensity calculator 112 may be in the form of, for example, an analog to digital converter that converts respective, analog output signals from the sensors 106-110 into digital form, followed by hardwired logic or a programmed processor performing the mathematical equation described above. This allows the ALS to compute, in real-time, a measure of the intensity of ambient light level outside of a portable electronic device in which the elements depicted in FIG. 1 may be integrated. The resulting measure of ambient light intensity may then be used by various applications running in the portable electronic device, including, for example, controlling brightness of a display screen for purposes of legibility and battery energy savings.

As suggested above, the light intensity calculation can alternatively be based on a single clear-color differential. For example, a single magenta color sensor 106 may be used together with the clear sensor 110, by taking the following differences:

$$\text{Intensity} \propto \text{Clear} - k * \text{Magenta} \quad [\text{Equation 2}]$$

where k is a proportionality or mismatch constant as before.

Figure 2:
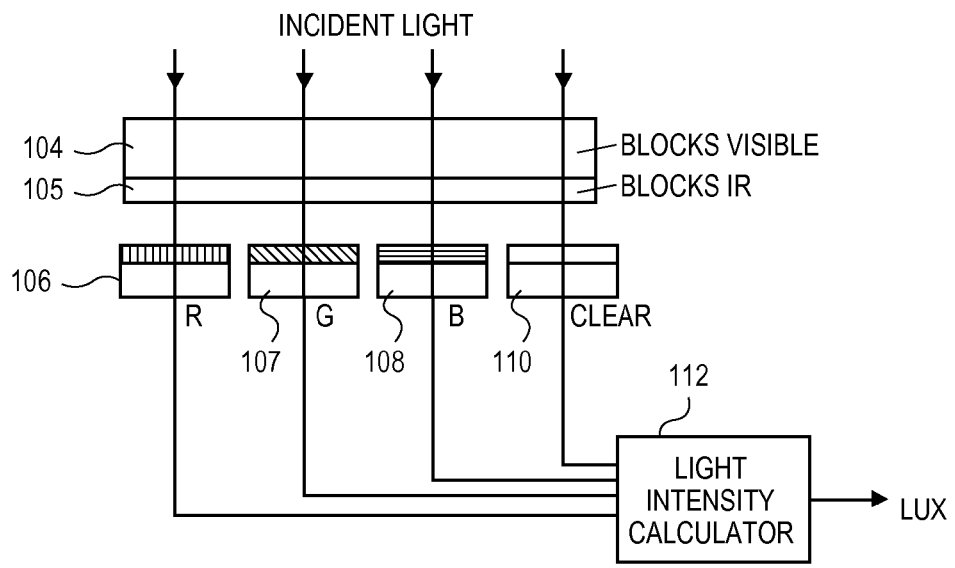
FIG. 2 is a block diagram of an ambient light sensor, in accordance with another embodiment of the invention.

Turning now to FIG. 2, a block diagram of another embodiment of the invention is shown. In this embodiment, the ALS has an RGB light sensor that is composed of four photodetectors, three of which make up a red sensor 106, a green sensor 107, and a blue sensor 108, respectively, which are electrically matched with that of a clear sensor 110. In addition, the common light filter (common to all of the sensors 106-110 in the light path) that is in front of the sensors 106-110 now includes not just the first filter 104 that blocks visible light, but also a second filter 105 that blocks IR content. For example, the second filter 105 may be an IR cut filter that passes visible content but rejects or blocks IR, e.g. its IR transmission is less than 5% while its visible transmission is more than 95%. The addition of the second filter 105 to block IR content may help improve overall sensitivity of the ALS relative to the visible content. A measure of the visible light intensity is again calculated by the light intensity calculator 112, this time in accordance with the following mathematical relationships:

$$\text{Clear}-k_1*\text{Red}=\text{Cyan Green'}=\text{Cyan}+\text{Yellow}$$

$$\text{Clear}-k_2*\text{Blue}=\text{Yellow} \Rightarrow \text{Red'}=\text{Magenta}+\text{Yellow}$$

$$\text{Clear}-k_3*\text{Green}=\text{Magenta Blue'}=\text{Magenta}+\text{Cyan} \quad \text{[Equations 3]}$$

where in the Cyan, Yellow, and Magenta values, the effect of the color sensors' IR response has been canceled due to the differentials. The conversion of the R', G', B' into a lux value may be in accordance with known techniques, such as the following equation $$\text{Lux}=(k_4*\text{Red'})+(k_5*\text{Green'})+(k_6*\text{Blue'}) \quad \text{[Equation 3b]}$$

where $k_4$, $k_5$ and $k_6$ are once again proportionality or mismatch constants that may be selected to weight or scale for fitting within a given spectral shape for the visible light.

In another embodiment, the measure of visible light intensity can be calculated starting with the opposite colors on the color wheel, using Cyan Magenta and Yellow color sensors (instead of RGB sensors). That embodiment could use the following equation $$\text{Clear}-k_1*\text{cyan}=\text{red}$$

$$\text{Clear}-k_2*\text{magenta}=\text{green}$$

$$\text{Clear}-k_3*\text{yellow}=\text{blue} \quad \text{[Equations 4]}$$

followed by conversion to lux using equation 3b above.

Figure 3:
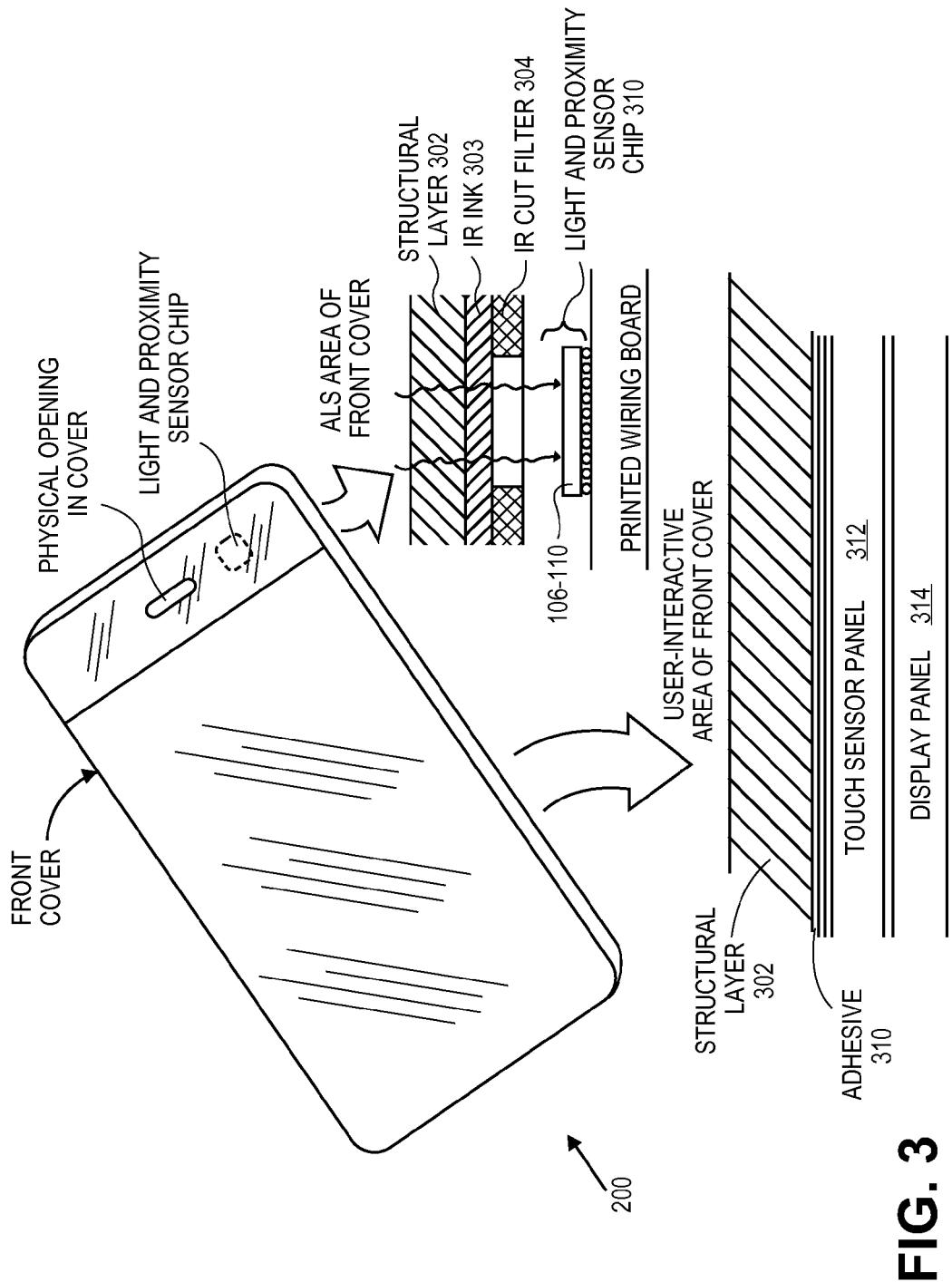
FIG. 3 shows an example implementation of the ALS portion of the front cover in a portable electronic device.

The various embodiments of the ALS described above may be incorporated or integrated into a portable electronic device 200 as depicted in FIG. 3. The electronic computing function blocks that make up the device 200 are shown in example form in FIG. 4 described further below. Beginning with FIG. 3, the device 200 may be any portable computing device such as, for example, a desktop personal computer, a laptop of notebook personal computer, a smart phone, a cellular phone, a portable navigation device, or a digital still or video camera. The device 200 has a front face which is exposed or visible when the device 200 has been laid down on a table, for example, or is positioned for its normal use. This is in contrast to the back cover or back face of the device 200, which would normally not be exposed to the user. It should also be noted that although a portable device is shown in FIG. 3, the ALS area of the front cover as shown in FIG. 3 could also be implemented in a non-portable electronic device such as a desktop personal computer (e.g., next to the display panel on the front face of a desktop personal computer).

The device 200 has an outer housing having integrated therein the front cover that has an ALS portion next to a user-interactive area. In this example, the ALS area of the front cover is near the top of the device 200, and encompasses a physical opening through the cover that can be used as an acoustic opening for a receiver (earpiece speaker). A light and proximity sensor chip 310 that is installed on a printed wiring board, and that incorporates the light sensors 106-110 of FIG. 2 as well as a proximity sensor, is shown as lying below or underneath the front cover. In contrast, below the user-interactive area, there is a touch sensor panel 312 superimposed with a display panel 314, such that the pair act as a touch sensitive screen underneath a visible light transmissive structural layer 302. As an example, the structural layer 302 may include a glass panel or a panel made of another visible light transmissive material (to allow the user to see visible light of a wide range of colors produced by the display panel 314 underneath), that is also strong enough to provide structural support to the front cover.

The ALS portion of the front cover contains a first filter which blocks visible light but not infrared light outside the device 200 from passing into a light path in the housing. In the example of FIG. 3, the first filter includes part of the structural layer 302 (e.g., a glass substrate) on which there is a coating of infrared light transmitting ink (IR ink 303) that also blocks visible light. Though not required, in the embodiment of FIG. 3, there is also a second filter that blocks infrared light but not visible light. This may be implemented in the form of IR cut filter 304 sandwiched with the IR ink 303 to the structural layer 302. The light and proximity sensor chip 310 containing the color and clear sensors 106-110 is located below the first and second filters as shown, so as to detect light in the light path after the filters. The IR cut filter 304 has a notch therein so as to pass IR content which is transmitted and received by the proximity sensor (when performing its proximity detection function).

Although not shown, the device 200 also contains a processor that is coupled to the light sensor chip 310 through the printed wiring board, where the processor is also coupled to control brightness of the display panel 314 (which is positioned in the user-interactive area of the front cover). The brightness of the display panel is controlled based on a calculated measure of the intensity of ambient visible light outside of the device 200, based on a difference between (a) an output signal of at least one color sensor in the light sensor chip 310, and (b) an output signal of the clear sensor. Alternatively, the light sensor chip 310 may include all four light sensors 106-110 which are depicted in FIG. 2, and the processor is to perform the functions described above in Equations 3 or in Equations 4 for the light intensity calculator 112, to derive a suitable measure of the ambient light intensity level.

Figure 4:
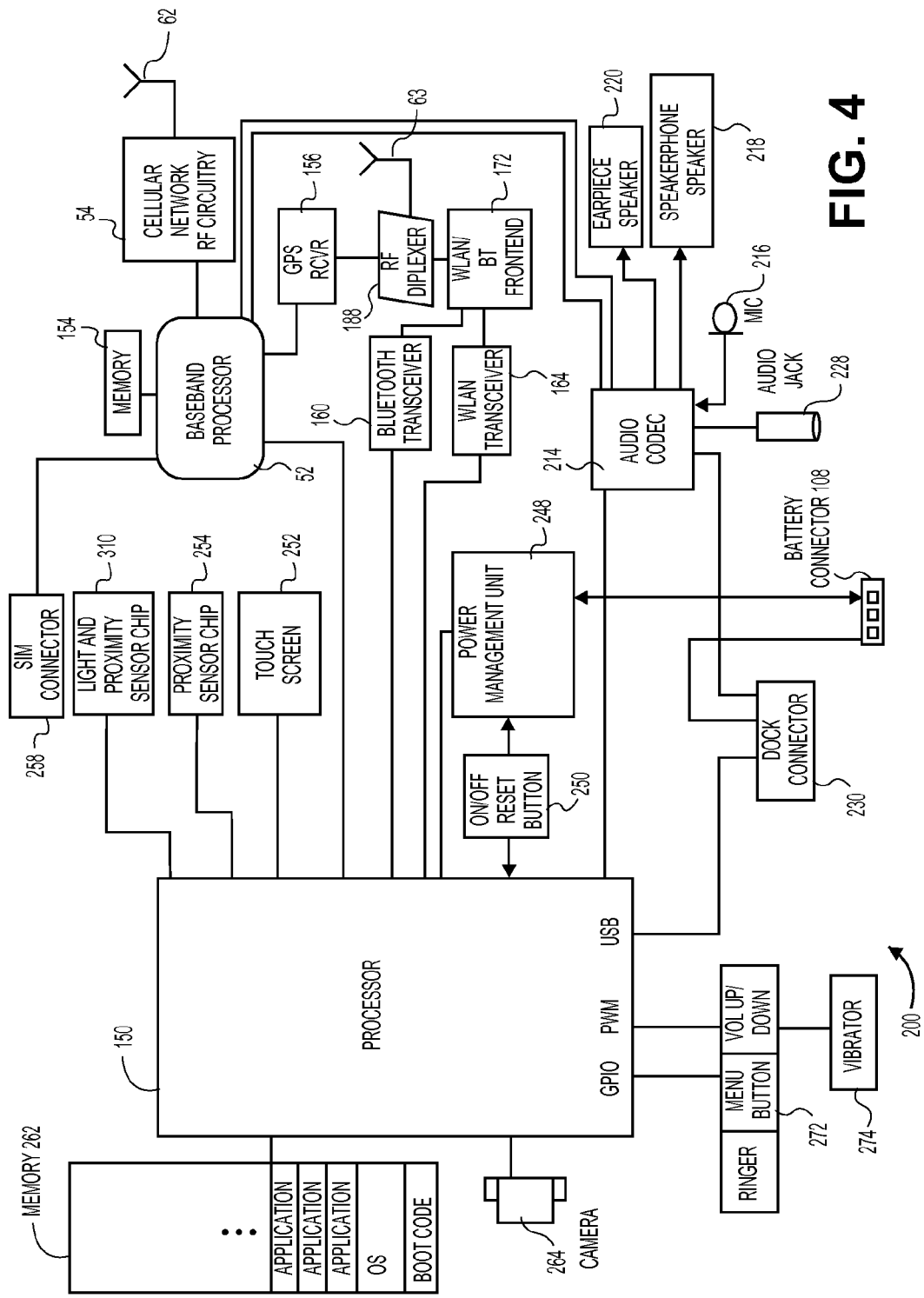
FIG. 4 is a block diagram of an example set of computing function blocks in the portable electronic device.

Turning now to FIG. 4, a block diagram of an example set of computing function blocks in the portable electronic device 200 is shown. These internal circuit components, for the most part, would be integrated within the housing of the device 200. In particular, this version of the device 200 is a smart phone that has several built-in electro-acoustic transducers that include a microphone 216, a receiver or earpiece speaker 220, and a loudspeaker or speakerphone 218. The microphone 216 may provide an output analog or digital audio signal, whereas the earpiece and speakerphone speakers 220, 218 are to receive input analog audio signals. Collectively, these may be referred to as acoustic transducer signals. An audio coder-decoder (codec) 214 is an interface to the output of the microphone and the inputs of the speakers, by, for example, providing all analog amplifiers and analog signal conditioning circuitry that is needed for conditioning any analog acoustic transducer signals, as well as any need A/D and D/A conversion of audio signals. The codec 214 may be a separate integrated circuit (IC) package.

In one example, the codec 214 operates in two modes and it can be configured into either mode via control signals or programming supplied by an applications processor 150 over a low overhead component bus. In one mode, referred to as media player mode, the device 200 is operating as a digital media player (e.g., an MP3 player that is playing back a music file stored in the device 200). In that mode, the codec 214 applies analog-to-digital and digital-to-analog conversion to the acoustic transducer signals, to generate corresponding digital signals. A digitized microphone signal is supplied to the applications processor, while a digital audio signal from the applications processor is converted into analog form and applied to either speaker 220, 218 for playback.

In another mode, referred to as "call mode", the device 200 is operating as a mobile telephony device (e.g., allowing its user to be in a real-time audio conversation with another remote user during a cellular telephone call). In that mode, the codec 214 may act as an analog pass through with no digital conversion, so that the acoustic transducer's signals are all analog and are simply passed through perhaps with some analog amplification or buffering, between the baseband processor 52 and the acoustic transducers.

The baseband processor 52 has an interface to receive signals from and transmit signals to a cellular network, via an antenna 62. The baseband processor which may be a separate IC package has an input port to receive a downlink signal from the antenna 62, and an output port to transmit an uplink signal to the antenna 62. These signals may be in a band around, for example, 26 MHz, but alternatively, they may be at other frequency bands that are considered intermediate (between baseband and RF at the antenna input). The uplink signal may be ready to be up converted to a cellular network RF signal, such as a long range wireless communications signal that is directed to a cellular telephone network base station, for example, in a 3G or universal mobile telecommunications system, UMTS, band, e.g. 850 MHz, 900 MHz, 18 MHz, and 19 MHz bands. Similarly, the downlink signal that is input to the baseband processor 52 may have been down converted from such an RF band, down to intermediate frequencies, e.g. 26 MHz band.

The uplink signal from the baseband processor 52 maybe up converted by a frequency up converter that is part of a cellular network RF circuit 54. The latter may be part of a separate, RF transceiver IC package. For the downlink side, the cellular network RF circuit 54 contains an RF down converter that translates the downlink signal from the radiation band of the antenna 62 to a lower frequency suitable for input to the baseband processor 52. The signal at the input or output port of the baseband processor 52 may thus be an intermediate frequency signal that is above baseband but below the RF frequency, or as an alternative, the RF up conversion and down conversion may be direct, that is direct from and to baseband rather than going through an intermediate frequency.

Baseband processor 52 may perform known cellular baseband processing tasks including cellular protocol signaling, coding and decoding, and signaling with external RF transceiver circuits. These, together with the RF processing in the external RF circuitry 54, may be referred to as the radio section of the device 200. The baseband processor 52 may be programmable in accordance with software that has been encoded and stored in associated, non-volatile memory 154. Permission to access the cellular network may be granted to a near-end user of the device 200, in accordance with a subscriber identify module, SIM, card that is installed into the device 200 to connect with a SIM connector 258.

The device 200 and the cellular network may be in agreement with respect to a particular voice coding scheme that is to be applied to a raw digital audio signal from the microphone 216 (the uplink signal), which is transmitted by the device 200. Similarly, an agreement is needed for the particular voice decode scheme that should be applied to the downlink signal. Any known voice coding and decoding schemes that are suitable for certain wireless communications protocols may be adopted. The voice coding and decoding sections of the baseband processor 52 may also be considered to be part of the radio section of the device 200.

The device 200 may also have further wireless communications capability to implement, for example, a global positioning system (GPS) service, a Bluetooth link, and a TCP/IP link to a wireless local area network. To this end, a Bluetooth transceiver 160 is included together with a wireless local area network (WLAN) transceiver 164 that provides additional wireless communication channels for the device 200. These two channels may share another integrated antenna 63, for short range wireless communications (e.g., in accordance with a Bluetooth protocol and/or a WLAN protocol). An RF diplexer 188 has a pair of RF ports that are coupled to the antenna 63. One of the ports is used for GPS services, which a GPS receiver IC 156 uses to obtain GPS data that allows the device 200 to locate itself to its user. The other RF port of the diplexer 188 is coupled to an RF front-end 172 that combines Bluetooth and WLAN RF signals.

The cellular network, GPS, Bluetooth, and WLAN services may be managed by programming the applications processor 150 to communicate with the base band processor 52, Bluetooth transceiver 160, and wireless transceiver 164 through separate, component buses. Although not shown, there may also be separate component buses connecting the base band processor 52 to the Bluetooth transceiver 160 and WLAN transceiver 164, to enable the latter transceivers to take advantage of the audio processing engine available in the base band processor 52, to, for example, conduct a wireless voice over IP call (using the WLAN transceiver 164) and to allow the near end user to conduct the call through a wireless headset (using Bluetooth transceiver 160).

The so-called power hungry components of the mobile device 200 may include the base band processor 52, the applications processor 150, the touch screen 252, and the transmit RF power amplifiers that are part of the RF circuitry 54. These are coupled to be monitored by a power management unit 248. The power management unit 248 may monitor power consumption by individual components of the device 200 and may signal power management commands to one or more of the components as needed so as to conserve battery energy and control battery temperature.

Other lower level hardware and functionality of the mobile device 200 include an on/off or reset button 250, a vibrator 274 used to indicate the ringing signal of an incoming call, an audio ringer, a physical menu button, and a volume up/down button (collectively referred to as circuit elements 272 which may be coupled to output pins of the processor 150 as shown). The mobile device 200 may also have a dock connector 230 that communicates with a USB port of the processor 150, allowing the device 200 to, for example, synchronize certain files of the user with corresponding files that are stored in a desktop or notebook personal computer of the same user. The dock connector 230 may also be used to connect with a power adapter or other electricity source for charging the battery (via the battery connector 108).

In a further embodiment, the mobile device 200 may have digital camera circuitry and optics 264 that are coupled to the processor 250, enabling the mobile device to be used as a digital still or video camera.

As explained above, the device 200 may have a front cover that has a user-interactive area that overlays the combination of a touch sensor panel 312 and a display panel 314, where the latter pair are combined to form a touch screen 252. In addition, referring back to FIG. 3, the front cover has an ALS portion which together with the light sensor chip 310 and the associated light intensity calculator 112 (see FIG. 1 or FIG. 2) may be deemed to perform an ALS function in the device 200. The device 200 may also include a separate proximity sensor chip 254 that includes, for example, an IR transmitter and receiver (not shown) that is located in the area of the front cover that is adjacent to or surrounding the physical opening that is the acoustic opening for the earpiece speaker (see FIG. 3). The proximity sensor 254 may be designed to transmit IR energy out through the front cover and receive scattered or reflected IR energy back through the front cover, which would indicate, for example, that the top portion of the front cover of the device 200 is positioned very close to the user's ear (e.g., as would occur during a phone call). Digital input and output signals of the ALS light sensor chip 310 and the proximity sensor chip 254 are used by the applications processor 150 as needed to provide ALS and proximity sensor functions used by various applications that may be running in the device 200 as explained below.

Having described the lower level components of the mobile device 200, a brief discussion of the higher level software functionality of the device is in order. As suggested above, the device 200 may have an applications processor 150 that executes boot code and an operating system (OS) stored in the memory 262. Running on top of the operating system are several application programs or modules that, when executed by the processor 150, manage at a high level the following example functions: placing or receiving a call (phone module); retrieving and displaying email messages (mail module); browsing the web (browser module); and digital media playback (iPod™ player module). Additional applications or widgets may be executed by the processor 150, including a clock function, SMS or text messaging service application, a weather widget, a calendar application, a street map navigation application, and a music download service application (the iTunes™ service).

As explained above, an embodiment of the ALS may have a machine-readable medium in which there are stored or encoded instructions that program a processor of the device to perform some of the operations described above upon digitized, color sensor and clear sensor values. In other embodiments, some of the operations of this ALS function module might be performed by specific hardware components that contain hardwired logic. Those operations might alternatively be performed by any combination of programmed data processing components and fixed hardware circuit components. A machine-readable medium may include any mechanism for storing or transferring information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM).

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, an alternative arrangement to the stack-up shown in FIG. 3 (for the ALS area of the front cover) may be to apply the IR cut filter 304 onto the structural layer 302, before applying the IR ink layer 303. The description is thus to be regarded as illustrative instead of limiting.

What is claimed is:

1. An ambient visible light sensing device comprising:
   a substrate on which there is a visibly opaque coating but through which ambient visible light is to pass;
   a first color sensor having a first color filter and a clear sensor having no color filter, to detect the ambient visible light after the substrate; and
   a light intensity calculator to compute a measure of the intensity of the ambient visible light, based on a difference between (a) an output signal of the first color sensor and (b) an output signal of the clear sensor.

2. The light sensing device of claim 1 further comprising:
   a second color sensor having a second color filter different from the first color filter, wherein the light intensity calculator is to compute the measure of the intensity of light further based on a difference between (a) an output signal of the second color sensor and (b) the output signal of the clear sensor.

3. The light sensing device of claim 2 wherein the first and second color sensors are red and blue sensors, respectively.

4. The light sensing device of claim 3 wherein to compute the measure of the intensity of light, the intensity calculator is to convert a difference between (a) an output signal of the first color sensor and (b) an output signal of the clear sensor, and another difference between (a) an output signal of the second color sensor and (b) the output signal of the clear sensor, which represent cyan and yellow values, into a green value.

5. The light sensing device of claim 2 wherein each of the first and second color sensors comprises a different color filter element that covers a respective photodetector element, and wherein
   the respective photodetector elements of the first and second color sensors and a photodetector element of the clear sensor are electrically matched.

6. The light sensing device of claim 2 further comprising:
   a third color sensor having a third color filter different from the first and second color filters to detect light in said light path, after the substrate, and wherein
   the light intensity calculator is to compute the measure of the intensity light further based on a difference between (a) an output signal of the third color sensor and (b) the output signal of the clear sensor.

7. The light sensing device of claim 6 wherein the first, second and third color sensors are red, blue, and green sensors, respectively.

8. The light sensing device of claim 7 wherein to compute the measure of the intensity of light, the intensity calculator is to convert 1) a difference between (a) an output signal of the first color sensor and (b) an output signal of the clear sensor, 2) another difference between (a) an output signal of the second color sensor and (b) the output signal of the clear sensor, and 3) a further difference between (a) an output signal of the third color sensor and (b) the output signal of the clear sensor, which represent cyan, magenta and yellow values, into red, green and blue values.

9. The light sensing device of claim 8 wherein the light intensity calculator is to compute the measure of the intensity of light as lux, based on the red, green and blue values.

10. An electronic device, comprising:
    a housing having integrated therein
        a front cover having a light transparent structural layer, the light transparent structural layer having a user-interactive display screen portion and an ambient light sensor portion, the ambient light sensor portion contains a visibly opaque layer that limits visible light outside the device from passing into a light path in the housing,
        a processor coupled to control brightness of the display screen portion based on a calculated measure of intensity of ambient light outside the device, and
        a first color sensor and a clear sensor, to detect light in said light path after the visibly opaque layer, wherein the processor is to calculate said measure of ambient light intensity based on a difference between (a) an output signal of the first color sensor and (b) an output signal of the clear sensor.

11. The electronic device of claim 10 wherein the housing has further integrated therein an infrared cut layer that limits infrared light in said light path, wherein the first color sensor and the clear sensor are to detect light in said light path after the visibly opaque and infrared cut layers.

12. The electronic device of claim 10 wherein said difference is based on scaling one or both of (a) the output signal of the first color sensor, and (b) the output signal of the clear sensor.

13. The electronic device of claim 10 wherein the light transparent structural layer comprises a glass substrate on which the visibly opaque layer is formed as a coating of infrared light transmitting visibly opaque ink.

14. The electronic device of claim 10 further comprising a second color sensor to detect light in the light path after the visibly opaque layer, wherein the processor is to compute the measure of the intensity of light further based on a difference between (a) an output signal of the second color sensor and (b) the output signal of the clear sensor.

15. The light sensing device of claim 14 wherein the first and second color sensors are red and blue sensors, respectively.

16. The electronic device of claim 15 wherein to compute the measure of the intensity of light, the processor is to convert a difference between (a) an output signal of the first color sensor and (b) an output signal of the clear sensor, and another difference between (a) an output signal of the second color sensor and (b) the output signal of the clear sensor, which represent cyan and yellow values, into a green value.

17. The electronic device of claim 14 wherein each of the first and second color sensors comprises a different color filter element that covers a respective photodetector element, and wherein
the respective photodetector elements of the first and second color sensors and a photodetector element of the clear sensor are electrically matched.

18. An electronic device comprising:
a first filter which blocks ambient visible light but not infrared light in a light path, so as to give a dark appearance from outside the device that does not allow electronics inside the device to be visible et still allows detection of the visible light;
a first color sensor and a clear sensor, to detect the ambient visible light in said light path after the first filter;
wherein the clear sensor is configured to output a signal indicative of the sensed intensity of light of several visible colors;
wherein the first color sensor is tuned to sense a color of visible light; and
a light intensity calculator to compute a measure of the intensity of the ambient visible light based on a difference between (a) an output signal of the first color sensor and (b) an output signal of the clear sensor.

19. The electronic device of claim 18 wherein the first filter comprises:
a substrate on which there is a coating of infrared light transmitting ink that also blocks visible light.

20. The electronic device of claim 18 further comprising:
a second color sensor, wherein the light intensity calculator is to compute the measure of the intensity of light further based on a difference between (a) an output signal of the second color sensor and (b) the output signal of the clear sensor.

21. The electronic device of claim 20 wherein the first and second color sensors are red and blue sensors, respectively.

22. The electronic device of claim 21 wherein the clear sensor outputs a signal that gives the sensed intensity of light across the entire visible spectrum; wherein to compute the measure of the intensity of light, the intensity calculator is to convert a difference between (a) an output signal of the first color sensor and (b) an output signal of the clear sensor, and another difference between (a) an output signal of the second color sensor and (b) the output signal of the clear sensor, which represent cyan and yellow values, into a green value.

23. The electronic device of claim 20 wherein each of the first and second color sensors comprises a different color filter element that covers a respective photodetector element, and wherein
the respective photodetector elements of the first and second color sensors and a photodetector element of the clear sensor are electrically matched.

24. The electronic device of claim 20 further comprising:
a third color sensor to detect light in said light path, after the first filter, and wherein
the light intensity calculator is to compute the measure of the intensity of light further based on a difference between (a) an output signal of the third color sensor and (b) the output signal of the clear sensor; and
wherein the clear sensor outputs a signal that gives the sensed intensity of light across the entire visible spectrum
wherein the first, second and third color sensors are red, blue, and green sensors, respectively; and
wherein to compute the measure of the intensity of light, the intensity calculator is to convert a difference between (a) an output signal of the first color sensor and (b) an output signal of the clear sensor, and another difference between (a) an output signal of the second color sensor and (b) the output signal of the clear sensor and a further difference between (a) an output signal of the third color sensor and (b) the output signal of the clear sensor, which represent cyan, magenta and yellow values, into red, green and blue values; and
wherein the light intensity calculator is to compute the measure of the intensity of light as lux, based on the red, green and blue values.

* * * * *